Patented Apr. 23, 1946

2,398,998

UNITED STATES PATENT OFFICE 2,398,998

ORGANIC POLYSULPHIDE PLASTIC COMPOSITIONS

Edward S. Blake, Nitro, W. Va., assignor to Monsanto Chemical Company, St. Louis, Mo., a corporation of Delaware No Drawing. Application April 30, 1943,
Serial No. 485,186

18 Claims. (Cl. 260—33)

This invention relates to plasticizing organic polysulphide plastic compositions and more particularly to plasticizing the organic polysulphides obtained by the reaction of an inorganic sulphide and an organic dihalide having the halogen atoms on different carbon atoms.

The organic polysulphide plastics are characterized by extreme insolubility in the ordinary rubber solvents although many of them resemble rubber in elastic behavior. A description of these products and the methods for their preparation may be found in United States Patents Nos. 1,854,423 and 1,890,191 granted to J. C. Patrick. The organic polysulphide plastics are extremely tough and strong even in the unvulcanized state and require special treatment to render them plastic enough to permit the incorporation of compounding and vulcanizing ingredients. Mastication on rubber rollers takes more time than with rubber and the material fails to adhere to the rolls.

It is an object of the present invention to provide new and different plasticizing agents for the organic polysulphide plastics. Another object is to provide a rapid method for plasticizing organic polysulphide plastics whereby the milling time may be reduced with consequent increase in production and saving of power. A further object is to make easier the handling of organic polysulphide plastics on rubber milling equipment. Still further objects will in part be apparent and in part specifically pointed out in the detailed description following.

In accordance with the present invention it has been found that these objects may be accomplished by subjecting the organic polysulphide plastic to the action of a sulphide of an alkyl xanthic acid. It has been found that small amounts of alkyl xanthic sulphides greatly decrease the resistance to flow of the organic polysulphide plastics and exert this effect in a remarkably short time. The best results have been obtained with thio anhydrides or monosulphides of alkyl xanthic acids and these are for that reason preferred but good softening action has also been obtained with the disulphides. The new agents possess the general type formula

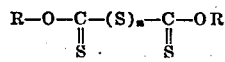

where the R's are alkyl groups and $n$ is an integer.

In general the quantity of xanthic sulphide to be employed will be between 0.25% and about 1.0% based on the organic polysulphide plastic. Larger quantities may however be employed but generally without advantage. Likewise, smaller quantities may be used although the softening action usually falls off rapidly below 0.20%. Furthermore, it is essential to have a small amount of a base, as for example diphenyl guanidine, in order to obtain the desired softening action. Usually the amount of base is less than the amount of the xanthic sulphide. Good results have been obtained with as little as 0.02% but between 0.05% to about 0.5% based on the weight of the polysulphide plastic is preferred. Again, larger or smaller amounts may be used where desired. Appreciable effect has been observed with as little as 0.01% of the base.

Xanthic sulphides are well known chemicals and the new softening and plasticizing agents can be prepared by methods disclosed in the literature or by methods closely analogous thereto. For example, thio anhydrides of xanthic acids can be prepared by treating an alkali metal xanthate with phosgene (Willcox, Jour. Am. Chem. Soc. 28, 1031-34) or with cyanogen chloride. Thus, ethyl xanthic thio anhydride was prepared by dissolving 693 parts by weight of potassium ethyl xanthate in 1740 parts by weight of carbon tetrachloride, cooling the solution to below 10° C. and adding 200 parts by weight of phosgene while keeping the mixture cold (below 5° C. during the greater part of the addition). The solvent was removed, conveniently by distillation, the residue washed with water and dried in the air. A good yield of ethyl xanthic acid thio anhydride was obtained.

Other compounds useful in this invention may be prepared by replacing the potassium ethyl xanthate with other xanthates as for example, potassium methyl xanthate or potassium amyl xanthate.

The alternative method is illustrated by the following: The potassium xanthate of methyl Cellosolve was prepared by adding 164 parts by weight of carbon disulphide to a mixture of 464 parts by weight of methyl Cellosolve and 124 parts by weight of 90% potassium hydroxide keeping the temperature below 40° C. throughout. The batch was stirred for several hours after the carbon disulphide was added and the pale yellow solid filtered off. Substantially 224 parts by weight of this product was dissolved in 750 parts by weight of water and the solution cooled to 8° C. Cyanogen chloride was then run in keeping the temperature below 8° C. The cyanogen chloride was generated by dissolving 26.8 parts by weight of 97% sodium cyanide in 72 parts by weight of water, cooling the solution below 8° C. and adding an aqueous solution containing 30.2 parts by weight sulphuric acid followed by chlorination below 5° C. After the chlorination was completed the cyanogen chloride was driven over into the cold xanthate solution by slowly heating on a water bath to 80–90° C. The yellow organic layer which had separated was then drawn off, washed with water and dried. The product, a heavy yellow oil, contained 36.28% sulphur. The calculated value for methoxy ethyl xanthic acid thio anhydride is 35.6% sulphur.

It will be appreciated that other methods of making the new softening and plasticizing agents may be employed where convenient or desirable. This invention is not concerned with the preparation of the compounds and is not limited thereto.

The following specific embodiments of the invention illustrate the invention and show the preferred means of carrying it into effect but are not limitative of the invention.

EXAMPLE I

A vulcanizable stock was compounded from Thiokol F which is apparently a reaction product of sodium polysulphide and a lower aliphatic dihalide. The stock consisted of Thiokol F 100, zinc oxide 10, stearic acid 0.50 and diphenyl guanidine 0.10 part by weight. On the average, from 45 to 50 minutes was consumed in the milling and compounding of this stock. It was found, however, that the addition of a small amount of ethyl xanthic thio anhydride at the beginning of the milling greatly reduced the total milling time and made the incorporation of compounding ingredients much easier. For example, the addition of 0.35 part by weight of ethyl xanthic thio anhydride reduced the total milling time to 10–15 minutes with a marked improvement in the dispersion of the compounding and vulcanizing ingredients.

The plasticity or resistance to flow of the stocks so compounded was determined by means of an extrusion plastometer. A description of the method and apparatus is given by J. H. Dillon in Rubber Chemistry and Technology, volume 9, (1936) pages 496–501. The quantity measured was the time in seconds required to extrude a given volume of the Thiokol stock at constant temperature and under constant pressure. All plastometer results described herein were obtained on test pellets cut by a suitable die and preheated 24 mins. at 90° C. The figures recorded are the times in seconds required to extrude the test pellet with 5 pounds air pressure per square inch on the plunger. The temperature of the plastometer was kept within the range of 82–85° C. The plasticity of the above described stocks in which the amount of softener is varied is shown in the table below:

Table I

| Ethyl xanthic thio anhydride, parts by weight | None | 0.25 | 0.28 | 0.32 | 0.35 | 0.38 |
|---|---|---|---|---|---|---|
| Plastometer reading, seconds | 119 | 94.50 | 47.50 | 30.50 | 18.0 | 16.5 |

EXAMPLE II

Table II shows the composition and plasticity of organic polysulphide plastic compositions containing 0.35 part of xanthic sulphide as softener.

Table II

| | Parts by weight | | |
|---|---|---|---|
| Thiokol F | 100 | 100 | 100 |
| Zinc oxide | 10 | 10 | 10 |
| Stearic acid | 0.5 | 0.5 | 0.5 |
| Diphenyl guanidine | 0.1 | 0.1 | 0.1 |
| Methyl xanthic thio anhydride | | 0.35 | |
| Ethyl xanthic disulphide | | | 0.35 |
| Plasticity in seconds | 119 | 23 | 32.5 |

EXAMPLE III

A base stock was compounded from Thiokol FA which is apparently a reaction product of sodium polysulphide and glycerol dichlor hydrin. The composition consisted of Thiokol FA 100, zinc oxide 10, stearic acid 0.5 and diphenyl guanidine 0.1 part by weight. Again the addition of a xanthic sulphide decreased the time required for milling and provided a stock much easier to handle. The proportion of softener added to this base stock and the plasticity readings on the final compositions are shown in Table III.

Table III

| Softener | Parts by weight | | | |
|---|---|---|---|---|
| | None | 0.20 | 0.25 | 0.30 |
| | Plasticity in seconds | | | |
| Methyl xanthic thio anhydride | >200 | 60 | 30 | 14 |
| Ethyl xanthic thio anhydride | >200 | 61 | 40 | 24 |
| Butyl xanthic thio anhydride | >200 | 157 | 82 | 52 |
| Amyl xanthic thio anhydride | >200 | 183 | 93 | 76 |
| Methoxy ethyl xanthic thio anhydride | | | | 41 |

The above data show the powerful softening and plasticizing effect of small amounts of the xanthic sulphides. It was further found that where desired sulphur could be added to the stocks without changing the plasticity characteristics very much. In fact the addition of 3 parts by weight of sulphur to a stock containing 0.3 part by weight ethyl xanthic thio anhydride gave a slightly lower plasticity reading than without the sulphur.

EXAMPLE IV

To a base stock consisting of Thiokol FA 100, zinc oxide 10, stearic acid 0.5 and ethyl xanthic thio anhydride 0.30 part by weight various basic materials were added and the plasticity of the compositions determined in the above described manner with an extrusion plastometer.

Table IV

| Basic ingredient | Parts by weight | Plasticity, seconds |
|---|---|---|
| None | | >200 |
| Guanidine nitrate | 0.1 | 42 |
| Guanidine carbonate | 0.1 | 66 |
| Thiourea | 0.1 | 80 |
| Ethylene diamine | 0.1 | 76 |
| O-Tolyl biguanide | 0.1 | 40 |
| Triethanol amine | 0.1 | 40 |
| Diamyl amine | 0.1 | 26 |
| Dicyclohexylamine | 0.1 | 20 |
| Diphenyl amine | 0.1 | 66 |

It is evident from the above data that while a basic ingredient is essential for the desired softening and plasticizing effect any basic material is satisfactory. Likewise, while 0.1 part by weight is generally about the optimum proportion of base the amount may vary considerably as shown below.

EXAMPLE V

Thiokol FA stocks containing one of the preferred softeners and varying amounts of diphenyl guanidine were compounded in the usual manner and the plasticity determined by means of an extrusion plastometer. The composition of the stocks and the plasticity are given in Table V.

*Table V*

|  | Parts by weight | | | | | | | |
|---|---|---|---|---|---|---|---|---|
| Thiokol FA | 100 | 100 | 100 | 100 | 100 | 100 | 100 | 100 |
| Zinc oxide | 10 | 10 | 10 | 10 | 10 | 10 | 10 | 10 |
| Stearic acid | 0.5 | 0.5 | 0.5 | 0.5 | 0.5 | 0.5 | 0.5 | 0.5 |
| Ethyl xanthic thio anhydride | 0.3 | 0.3 | 0.3 | 0.3 | 0.3 | 0.3 | 0.3 | 0.3 |
| Diphenyl guanidine |  | 0.01 | 0.02 | 0.05 | 0.1 | 0.15 | 0.2 | 0.3 |
| Plasticity in seconds | >200 | 148 | 80 | 26 | 20 | 20 | 20 | 30 |

EXAMPLE VI

Ethyl xanthic thio anhydride was added to Thiokol N on a rubber mill. Thiokol N is believed to be the reaction product of sodium polysulphide and ethylene dichloride. The plasticity of the composition was markedly increased and the incorporation of the compounding ingredients made much easier and speedier. The plasticity figures in the table below show powerful softening action.

*Table VI*

|  | Parts by weight | |
|---|---|---|
| Thiokol N | 100 | 100 |
| Zinc oxide | 10 | 10 |
| Stearic acid | 1 | 1 |
| Diphenyl guanidine | 0.1 | 0.1 |
| Ethyl xanthic thio anhydride | 0.2 | 0.35 |
| Plasticity in seconds | 71 | 14 |

The polysulphide plastics useful in this invention can be made from any water soluble inorganic polysulphide. These are reacted with dihalides having the halogen atoms on different carbon atoms, suitable examples of which are ββ dichlor ethyl ether, ethylene dibromide, propylene dichloride, butadiene dichloride (dichloro-1:4 butene-2) and the like.

The mixing of the polysulphide plastic with the softener may be done in a Banbury type mixer, a Gordon plasticator or on an ordinary rubber mill or on other types of equipment for handling tough plastic products. Alternatively, the softener may be added to a benzene or aqueous dispersion of the polysulphide plastic.

Again, this invention is not limited to the specific embodiments of the invention. The preferred materials may be employed in different proportions than specifically shown and in conjunction with other compounding and vulcanizing ingredients. Obviously, many variations can be made without departing from the spirit of the present invention. This invention is limited solely by the claims attached hereto as part of the present specification.

What is claimed is:

1. The method of softening and plasticizing a polymeric organic sulphide obtained by the reaction of an alkaline polysulphide and an aliphatic dihalide having the halogen on separate carbon atoms which comprises subjecting the polymeric organic sulphide to milling in the presence of small amounts sufficient to increase the plasticity of the polymer each of an organic base and a sulphide of the structure

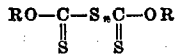

where the R's are alkyl groups and $n$ is an integer less than three.

2. The method of softening and plasticizing a polymeric organic sulphide obtained by the reaction of an alkaline polysulphide and an aliphatic dihalide having the halogen on separate carbon atoms which comprises subjecting the polymeric organic sulphide to milling in the presence of small amounts sufficient to increase the plasticity of the polymer each of an organic base and an alkyl xanthic thio anhydride.

3. The method of softening and plasticizing a polymeric organic sulphide obtained by the reaction of an alkaline polysulphide and an aliphatic dihalide having the halogen on separate carbon atoms which comprises subjecting the polymeric organic sulphide to milling in the presence of a small amount at least 0.02% of an organic base and a small amount at least 0.2% of an alkyl xanthic thio anhydride.

4. The method of softening and plasticizing a polymeric organic sulphide obtained by the reaction of an alkaline polysulphide and an aliphatic dihalide having the halogen on separate carbon atoms which comprises subjecting the polymeric organic sulphide to the action of about 0.01% to 0.5% diphenyl guanidine and about 0.25% to 1.0% of an alkyl xanthic thio anhydride.

5. The method of softening and plasticizing a polymeric organic sulphide obtained by the reaction of an alkaline polysulphide and an aliphatic dihalide having the halogen on separate carbon atoms which comprises subjecting the polymeric organic sulphide to the action of about 0.1% of an organic base and about 0.25 to 1.0% of an alkyl xanthic thio anhydride of the structure

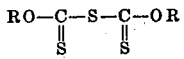

where the R's are alkyl groups containing less than six carbon atoms.

6. The method of softening and plasticizing a polymeric organic sulphide obtained by the reaction of an alkaline polysulphide and an aliphatic dihalide having the halogen on separate carbon atoms which comprises subjecting the polymeric organic sulphide to the action of about 0.01% to 0.5% diphenyl guanidine and about 0.25 to 1.0% of ethyl xanthic thio anhydride.

7. The method of softening and plasticizing a polymeric organic sulphide obtained by the reaction of an alkaline polysulphide and an aliphatic dihalide having the halogen on separate carbon atoms which comprises subjecting the polymeric organic sulphide to the action of about 0.01% to 0.5% diphenyl guanidine and about 0.25 to 1.0% of methyl xanthic thio anhydride.

8. The method of softening and plasticizing a polymeric organic sulphide obtained by the reaction of an alkaline polysulphide and an aliphatic dihalide having the halogen on separate carbon atoms which comprises subjecting the polymeric organic sulphide to the action of about 0.1% of diphenyl guanidine and about 0.3% of ethyl xanthic thio anhydride.

9. The method of softening and plasticizing a polymeric organic sulphide obtained by the reaction of an alkaline polysulphide and an aliphatic dihalide having the halogen on separate carbon atoms which comprises subjecting the polymeric organic sulphide to the action of about 0.1% of diphenyl guanidine and about 0.3% of ethyl xanthic disulphide.

10. A softened and plastic polymeric organic sulphide obtained by the reaction of an alkaline polysulphide and an aliphatic dihalide having the halogen on separate carbon atoms obtained by subjecting the polymeric organic sulphide to milling in the presence of small amounts sufficient to increase the plasticity of the polymer each of an organic base and a sulphide of the structure

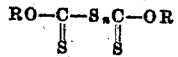

where the R's are alkyl groups and $n$ is an integer less than three.

11. A softened and plastic polymeric organic sulphide obtained by the reaction of an alkaline polysulphide and an aliphatic dihalide having the halogen on separate carbon atoms obtained by subjecting the polymeric organic sulphide to milling in the presence of small amounts sufficient to increase the plasticity of the polymer each of an organic base and an alkyl xanthic thio anhydride.

12. A softened and plastic polymeric organic sulphide obtained by the reaction of an alkaline polysulphide and an aliphatic dihalide having the halogen on separate carbon atoms obtained by subjecting the polymeric organic sulphide to milling in the presence of a small amount at least 0.02% of an organic base and a small amount at least 0.2% of an alkyl xanthic thio anhydride.

13. A softened and plastic polymeric organic sulphide obtained by the reaction of an alkaline polysulphide and an aliphatic dihalide having the halogen on separate carbon atoms obtained by subjecting the polymeric organic sulphide to the action of about 0.01% to 0.5% diphenyl guanidine and about 0.25% to 1.0% of an alkyl xanthic thio anhydride.

14. A softened and plastic polymeric organic sulphide obtained by the reaction of an alkaline polysulphide and an aliphatic dihalide having the halogen on separate carbon atoms obtained by subjecting the polymeric organic sulphide to the action of about 0.1% of an organic base and about 0.25 to 1.0% of an alkyl xanthic thio anhydride of the structure

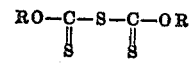

where the Rs are alkyl groups containing less than six carbon atoms.

15. A softened and plastic polymeric organic sulphide obtained by the reaction of an alkaline polysulphide and an aliphatic dihalide having the halogen on separate carbon atoms obtained by subjecting the polymeric organic sulphide to the action of about 0.01% to 0.5% diphenyl guanidine and about 0.25 to 1.0% of ethyl xanthic thio anhydride.

16. A softened and plastic polymeric organic sulphide obtained by the reaction of an alkaline polysulphide and an aliphatic dihalide having the halogen on separate carbon atoms obtained by subjecting the polymeric organic sulphide to the action of about 0.01% to 0.5% diphenyl guanidine and about 0.25 to 1.0% of methyl xanthic thio anhydride.

17. A softened and plastic polymeric organic sulphide obtained by the reaction of an alkaline polysulphide and an aliphatic dihalide having the halogen on separate carbon atoms obtained by subjecting the polymeric organic sulphide to the action of about 0.1% of diphenyl guanidine and about 0.3% of ethyl xanthic thio anhydride.

18. A softened and plastic polymeric organic sulphide obtained by the reaction of an alkaline polysulphide and an aliphatic dihalide having the halogen on separate carbon atoms obtained by subjecting the polymeric organic sulphide to the action of about 0.1% of diphenyl guanidine and about 0.3% of ethyl xanthic disulphide.

EDWARD S. BLAKE.